United States Patent [19]
Snell et al.

[11] Patent Number: 5,414,243
[45] Date of Patent: May 9, 1995

[54] ELECTRIC TOASTING MACHINES WITH VARIABLE TIMING CIRCUIT

[75] Inventors: Julien Snell, Burgess Hill; Leslie A. Gort-Barten, Dulwich Common, both of England

[73] Assignee: Maxmilian Gort-Barten, London, England

[21] Appl. No.: 243,947

[22] Filed: May 17, 1994

Related U.S. Application Data

[63] Continuation-in-part of Ser. No. 152,866, Nov. 12, 1993.

[30] Foreign Application Priority Data

Nov. 13, 1992 [GB] United Kingdom ............... 9223846
Feb. 11, 1993 [GB] United Kingdom ............... 9302670

[51] Int. Cl.$^6$ .............................................. H05B 1/02
[52] U.S. Cl. ................................ 219/492; 219/497; 219/518; 219/514; 99/329 P; 99/328; 99/332
[58] Field of Search ............... 219/518, 514, 497, 492, 219/501, 505; 99/327, 325, 328, 329 P, 332

[56] References Cited

U.S. PATENT DOCUMENTS

| | | | |
|---|---|---|---|
| 2,147,376 | 2/1939 | Lucia | 99/333 |
| 2,431,195 | 11/1947 | Olving | 219/492 |
| 2,567,075 | 9/1951 | Lindberg | 99/328 |
| 2,584,725 | 2/1952 | McNairy | 219/492 |
| 2,842,200 | 7/1958 | Graham | 219/492 |
| 3,956,978 | 5/1976 | Borley | 99/329 R |
| 4,245,148 | 1/1981 | Gisske et al. | 219/492 |
| 4,296,312 | 10/1981 | Salem | 219/501 |
| 4,454,803 | 6/1984 | Wolf et al. | 9/329 RT |
| 4,503,758 | 3/1985 | Carville | 99/329 |
| 4,510,376 | 4/1985 | Schneider | 219/492 |
| 4,518,849 | 5/1985 | Rolland | 219/492 |
| 4,755,656 | 7/1988 | Charlesworth et al. | 219/492 |
| 5,128,521 | 7/1992 | Lanno et al. | 219/518 |
| 5,283,421 | 2/1994 | Richards | 219/492 |

FOREIGN PATENT DOCUMENTS

| | | | |
|---|---|---|---|
| 86624 | 8/1993 | European Pat. Off. | 99/327 |
| WO90/07899 | 7/1990 | WIPO . | |

*Primary Examiner*—Mark H. Paschall
*Attorney, Agent, or Firm*—Kinney & Lange

[57] ABSTRACT

A toasting machine comprising heating elements, an on/off switch for initiating a toasting cycle, a toast colour selection knob for setting a selected time period for a toasting cycle, a timing circuit arranged to measure the elapsed time since a previous toasting cycle and including time booster means, a control circuit responsive to the toast colour selection setting and the timing circuit, a connection line and plug for connecting the toasting machine to an electrical power supply so as to supply power to the heating elements on initiation of a toast cycle by the on/off switch and under control of the control circuit, a temperature measuring device arranged to measure the temperature of the toasting machine and supply a temperature representing signal to the control circuit, the control circuit being arranged to control the timing of a current toasting cycle in dependence both on the setting of the toast colour selection switch and on the timing circuit, so that the toasting cycle time period during which power is supplied to the heating elements is increased over the selected time period by one or more boost periods both if the elapsed time since a previous toast cycle exceeds a predetermined elapsed time and on the first toasting cycle after connection of the connection line to the power supply, except that if the temperature as measured by the temperature measuring device exceeds a predetermined temperature the control circuit acts in response to said signal so that it does not increase the selected time period by the boost period. Preferably there are first, second and third boost periods dependent on first, second and third elapsed times.

9 Claims, 2 Drawing Sheets

5,414,243

ELECTRIC TOASTING MACHINES WITH VARIABLE TIMING CIRCUIT

This application is a continuation in part of application Ser. No. 08/152866 filed Nov. 12th 1993 now pending.

FIELD AND BACKGROUND OF THE INVENTION

This invention relates to electric toasting machines of the kind designed and arranged for the toasting particularly of bakery products such as slices of bread, sandwiches, bread buns, teacakes, crumpets and baps, but also for toasting/grilling of other food products.

Toasting machines for this purpose commonly have radiant heating elements which are arranged to be set a short distance from one or both sides of the food product to be toasted, and commonly the degree or colour of toasting is determined in dependence on the length of time the heating element or elements is or are energised. A "toast colour selection" setting control is provided for selecting a time period for a toasting cycle. For example a selected time period is usually selectable within the range 5 seconds to 240 seconds.

A problem arises with conventional arrangements in that the heating elements operate more efficiently and provide greater toasting if the heating elements have recently been used so that the toasting machine is still hot from a previous usage, by comparison with the time taken for satisfactory toasting when the machine has not been used for some considerable period of time so that the machine has little or no retained heat from previous usage. It is known from, for example, U.S. Pat. Nos. 5,128,521, 4,510,376, 4,503,758 and 4,454,803 to use a microprocessor in a toasting machine to select a current heating cycle in dependence both on the toast colour selection setting and prior use of the toasting machine since connection to a power source. For example in these specifications the microcprocessor has a memory in which are included a plurality of tables of toasting time cycles and the microprocessor selects a particular table in dependence on (a) the toast colour selected, (b) the length of the last toast cycle, (c) the time since the last toast cycle, and (d) the number of previous cycles in a set period prior to initiation of a current cycle. Such systems are relatively complicated and expensive. They do not necessarily allow for extension of the time period set after first connection of a toaster to a power source.

SUMMARY OF THE INVENTION

The present invention aims to provide consistent toasting in a relatively simple manner for achieving by adding a boost period to the period set by the toast colour selection means both if the toasting machine has not been used for a predetermined elapsed time since previous toasting and on first connection of the machine to a power source.

One of the problems associated with such toasting machines, particularly in commercial establishments where space is at a premium, is that the toasting machine is often moved from one power connection point to another shortly after it has been used. In this case the toaster is still hot and a boost period is undesirable. Accordingly, in a preferred form of the invention the toasting machine is arranged to cancel the boost period normally added on first connection of the toasting machine to a power supply if the toasting machine exceeds a predetermined temperature.

The invention provides a toasting machine comprising heating means, a switch means for initiating a toasting cycle, a toast colour selection means for setting a selected time period for a toasting cycle, a timing circuit arranged to measure the elapsed time since a previous toasting cycle, the timing circuit including time booster means, control means responsive to the toast colour selection means and the timing circuit, connection means for connecting the toasting machine to an electrical power supply so as to supply power to the heating means on initiation of a toast cycle by the switch means and under control of the control means, a temperature measuring device arranged to measure the temperature of the toasting machine and supply a temperature representing signal to the control means, the control means arranged to control the timing of a current toasting cycle in dependence on both the setting of the toast colour selection switch and the timing circuit, so that the toasting cycle time period during which power is supplied to the heating means is increased over the selected time period by a boost period both if the elapsed time since a previous toast cycle exceeds a predetermined elapsed time and on the first toasting cycle after connection of the connection means to the power supply, except that if the temperature as measured by the temperature measuring device exceeds a predetermined temperature the control means acts in response to said signal so that it does not increase the selected time period by the boost period.

Preferably the control means is arranged to increase the toasting cycle time period by a first boost period if the toasting machine has not been used for a first predetermined elapsed time, a second boost period longer than the first period if the toasting machine has not been used for a second elapsed period longer than the first elapsed period and by a third boost period longer than the second boost period if the toasting machine has not been used for a third elapsed period longer than the second elapsed period.

In another aspect the invention provides a toasting machine comprising heating means, a switch means for initiating a toasting cycle, a toast colour selection means for setting a selected time period for a toasting cycle, a timing circuit arranged to measure the elapsed time since a previous toasting cycle, the timing circuit including time booster means, control means responsive to the toast colour selection means and the timing circuit, connection means for connecting the toasting machine to an electrical power supply so as to supply power to the heating means on initiation of a toast cycle by the switch means and under control of the control means, the control means being arranged to control the timing of a current toasting cycle in dependence on both the setting of the toast colour selection switch and the timing circuit, so that the toasting cycle time period during which power is supplied to the heating means is increased over the selected time period by a first boost period if the toasting machine has not been used for a first predetermined elapsed time, a second boost period longer than the first period if the toasting machine has not been used for a second elapsed period longer than the first elapsed period and by a third boost period longer than the second boost period if the toasting machine has not been used for a third elapsed period longer than the second elapsed period, and by the third time boost period on the first toasting cycle after connection of the connection means to the power supply.

Preferably the first boost period is about 5 to 10 seconds and the first elapsed period about 10 minutes, the second boost period is about 10 to 20 seconds and the second elapsed period about 20 minutes and the third boost period is about 20 to 30 seconds and the third elapsed period about 30 minutes.

BRIEF DESCRIPTION OF THE DRAWINGS

One embodiment of toasting machine, in accordance with the invention, will now be described, by way of example only, with reference to the accompanying drawings of which.

DETAILED DESCRIPTION OF ONE EMBODIMENT OF THE INVENTION

Figure 1:
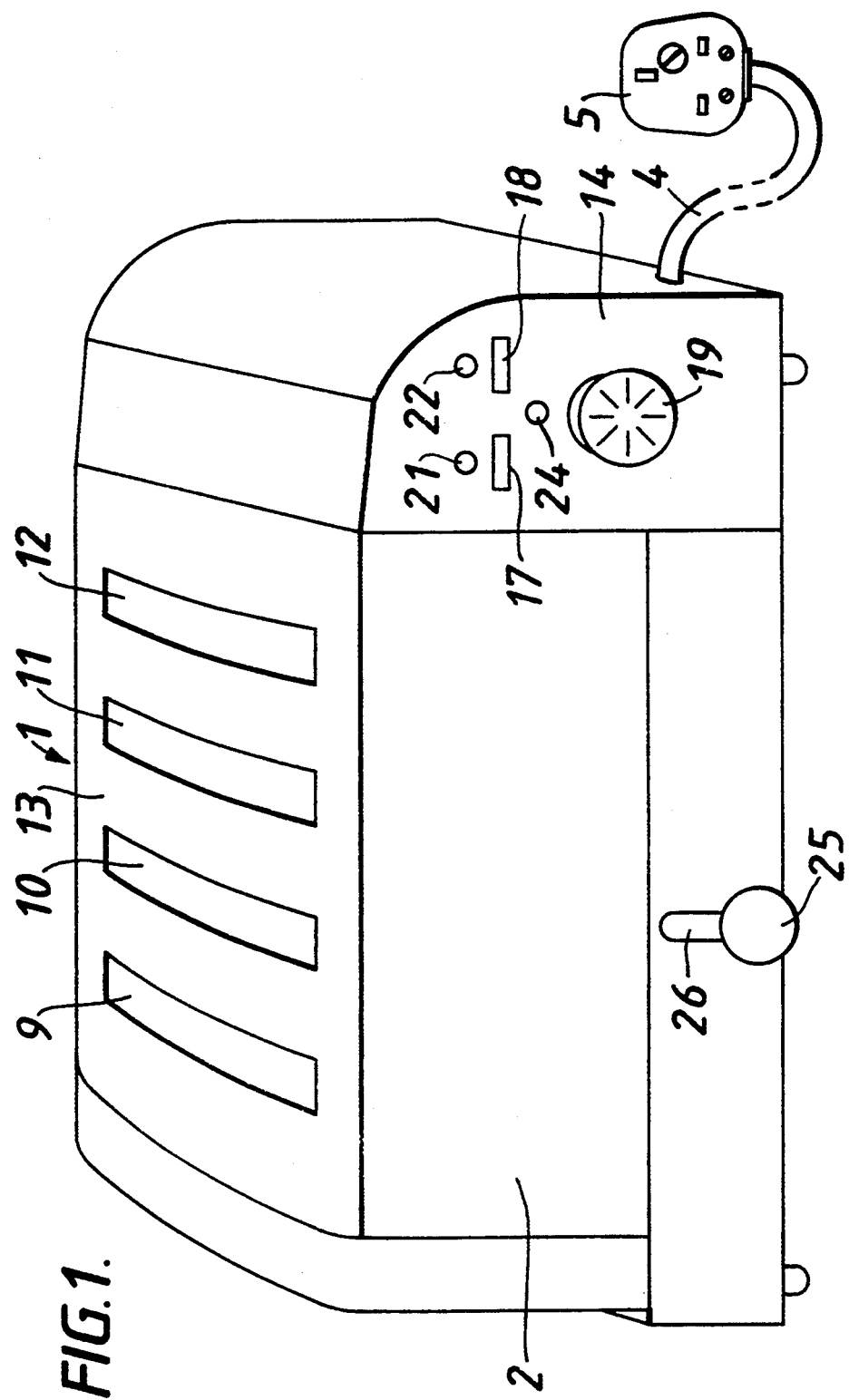
FIG. 1 is a schematic isometric view of a toaster incorporating the present invention.
Figure 2:
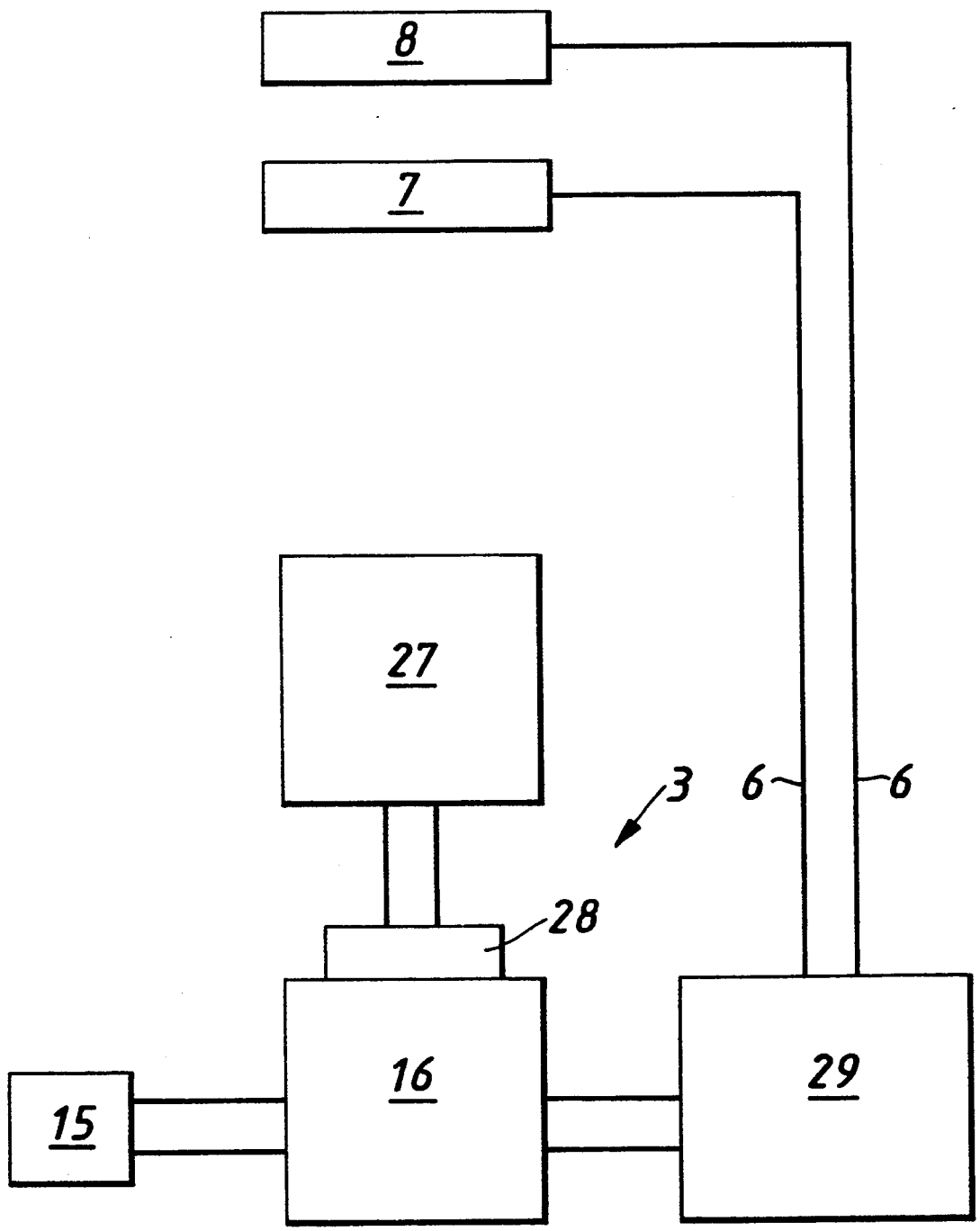
FIG. 2 is a functional diagram of the circuitry for the toaster of FIG. 1.

The toasting machine/toaster 1 is of a kind commonly used in domestic or commercial establishments and is provided with a main body casing 2 and a control circuit 3 connected via a connection line 4 and plug 5 to a power supply indicated in FIG. 2 at 29. The power supply will supply power via lines 6, under control of the control circuit, to banks of electrical heating elements indicated at 7 and 8. These heating elements are located within the casing, in known manner, on either side of slots 9, 10, 11 and 12 opening through the top 13 of the casing. The control circuit is located in the end part 14 of the casing. The heating elements are divided into two banks, those 7 being associated with toast slots 9 and 10 and those 8 being associated with toast slots 11 and 12 respectively. Two on/off touch button switches 17, 18 are arranged respectively for operation of either the elements 7 only or the elements 7 and 8 so that the operator can choose to toast in two slots only or all four slots. Depression of one of the buttons starts a timing cycle which can be interrupted by means of further depression of either of the buttons.

A rotatable "toast colour selection" knob 19 is provided for varying the timing cycle in association with a potentiometer. The time selected by this knob can be within the range 5 seconds to 240 seconds. The arrangement is such that if during a particular timing cycle, the set time is adjusted, it takes effect immediately. On completion of the timing cycle a sound signal may be given, followed by the de-energisation of the heating elements, and one of two LED indicators 21, 22, is then illuminated. Thereafter the toasted bread may be raised for removal by vertical movement of a knob 25 in a slot 26. The LED indicators 21, 22, which may be of red colour, provide an indication of whether one bank or both banks of the elements are energised.

The control means 3 includes a main control circuit 16 including a micro-controller chip. The microchip arrangement may include a fault detection system and can be arranged to indicate by means of flashing LED's 21 and 22 should any particular heating element fail. Additionally the arrangement may enable the failure of a timing potentiometer to initiate flashing of a further LED 24, which may be green. The arrangement may be such that the unit can operate during a fault condition, but in this case if the time cycle setting pot fails then the operation of the unit will automatically operate on a set time, for example 150 seconds.

The main microchip circuitry 16 is subject to the user controls as well as controlling the numerous status indicators (as described above), all of which are designated by the box 27 in FIG. 2. In addition the control circuit (which operates at five volts via the main power supply) includes a timing circuit including a time booster sub circuit, all indicated at 28, which allows the time selected by the toast colour selection means to be increased by a time boost period. The timing circuit 28 is arranged to measure the elapsed time since a previous toasting cycle. The timing circuit supplies a signal to the microchip and the microchip is arranged to boost the current cycle time period by a time boost period which is added to the selected time period by the toast colour selection setting. In this example the arrangement is such that there are three different elapsed time periods associated with three different boost periods. Preferably the first boost period is about 5 seconds and the first elapsed time period about 10 minutes, the second boost period is about 10 seconds and the second elapsed time period about 20 minutes and the third boost period is about 20 second and the third elapsed time period about 30 minutes. Clearly other times can be chosen.

In addition the control circuit is arranged to add a time boost period, preferably corresponding to the maximum or third time boost period as set out above, after first connection of the toasting machine to a power supply.

In addition the control circuit includes a thermistor 15 arranged to measure the temperature within the casing of the toasting machine. If the temperature exceeds a predetermined temperature, preferably above 30° C., for example 32° C., the thermistor supplies a signal to the microchip and the microchip cancels any boost period which would otherwise be added. This ensures that if the toasting machine is unplugged from one power source and then reconnected to a power source whilst still hot, the current toasting time cycle will not be increased above the selected time period by any boost period.

We claim:

1. A toasting machine comprising: heating means for toasting food products during a toasting cycle;

switch means for initiating the toasting cycle;

toast colour selection means for setting a selected time period for the toasting cycle;

a timing circuit arranged to measure an elapsed time since a previous toasting cycle, the timing circuit including time booster means for providing a boost time period during a current toasting cycle;

connection means for connecting the toasting machine to an electrical power supply so as to supply power to the heating means on initiation of the toasting cycle by the switch means;

a temperature measuring device arranged to measure a temperature within the toasting machine and to provide a signal indicative thereof; and control means for controlling the time period of the current toasting cycle, the control means being connected to the toast colour selection means, the timing circuit, and the temperature measuring device, so that the current toasting cycle time period is increased over the selected time period by the boost time period both if the elapsed time since a previous toast cycle exceeds a predetermined elapsed time and on the first toasting cycle after connection of the connection means to the power supply, except that if the temperature as measured by the temperature measuring device exceeds a predetermined temperature then the control means acts in response to said signal so that it does not increase the selected time period by the boost time period.

2. A toasting machine according to claim 1 in which the control means is arranged to increase the toasting cycle time period by a first boost period if the toasting machine has not been used for a first predetermined elapsed time, by a second boost period longer than the first period if the toasting machine has not been used for a second elapsed time longer than the first elapsed time, and by a third boost period longer than the second boost period if the toasting machine has not been used for a third elapsed time longer than the second elapsed time.

3. A toasting machine according to claim 2 in which the control means is arranged to increase the selected time period by the third boost period on the first toasting cycle connection of the connection means to a power supply.

4. A toasting machine according to claim 2 in which the control means is arranged to cut out all the first, second and third boost periods if the predetermined temperature is exceeded.

5. A toasting machine according to claim 1 in which the predetermined temperature is greater than approximately 30° C.

6. A toasting machine according to claim 1 in which the boost period is in the range 5 to 40 seconds.

7. A toasting machine according to claim 1 in which the range of time periods which can be set by the toast colour selection means, is in the range 30 seconds to 240 seconds.

8. A toasting machine according to claim 2 in which the first boost period is about 5 seconds and the first elapsed time about 10 minutes, the second boost period is about 10 seconds and the second elapsed time about 20 minutes, and the third boost period is about 20 seconds and the third elapsed time about 30 minutes.

9. A toasting machine comprising:
a heating element;
switch means for initiating a toasting cycle;
toast colour selection means for setting a selected time period for the toasting cycle;
a timing circuit arranged to measure the elapsed time since a previous toasting cycle, the timing circuit including time booster means for providing a boost time period during a current toasting cycle;
connection means for connecting the toasting machine to an electrical power supply so as to supply power to the heating element on initiation of the toasting cycle by the switch means; and
control means for controlling the time period of the current toasting cycle, the control means being connected to the toast colour selection switch and to the timing circuit, so that the toasting cycle time period is increased over the selected time period by a first boost time period if the toasting machine has not been used for a first predetermined elapsed time, by a second boost time period longer than the first boost time period if the toasting machine has not been used for a second elapsed time longer than the first elapsed time, by a third boost time period longer than the second boost time period if the toasting machine has not been used for a third elapsed time longer than the second elapsed time, and by the third boost time period on the first toasting cycle after connection of the connection means to the power supply.

* * * * *